United States Patent [19]

Dahnert

[11] Patent Number: 4,650,264
[45] Date of Patent: Mar. 17, 1987

[54] CONTROL SYSTEM FOR VERTICAL STORAGE EQUIPMENT

[75] Inventor: Dean L. Dahnert, Fort Atkinson, Wis.

[73] Assignee: Spacesaver Corporation, Fort Atkinson, Wis.

[21] Appl. No.: 680,223

[22] Filed: Dec. 10, 1984

Related U.S. Application Data

[63] Continuation-in-part of Ser. No. 560,499, Dec. 12, 1983, abandoned.

[51] Int. Cl.⁴ ............................................. A47B 49/00
[52] U.S. Cl. ..................................... 312/268; 108/22; 198/794; 211/1.5; 211/121; 222/371; 312/97
[58] Field of Search ................... 312/91, 97, 97.1, 266, 312/267, 268, 269; 211/1.5, 121, 122; 108/20, 21, 22; 198/502.3, 810, 794, 858; 222/371

[56] References Cited

U.S. PATENT DOCUMENTS

| | | | |
|---|---|---|---|
| 1,494,732 | 5/1924 | Cahoon | 198/858 X |
| 2,678,250 | 5/1954 | Heinig | 312/97 X |
| 3,141,123 | 7/1964 | Olson | 312/268 X |
| 3,480,343 | 11/1969 | Kanitz | 312/269 X |
| 3,589,785 | 6/1971 | Appleby | 312/268 |
| 3,639,023 | 1/1972 | Anders et al. | 312/91 X |
| 3,701,414 | 10/1972 | Mayer et al. | 198/810 X |
| 3,915,531 | 10/1975 | Morgan | 312/268 |
| 4,026,617 | 5/1977 | Basio et al. | 312/91 X |
| 4,401,034 | 8/1983 | Gaudet | 198/310 X |
| 4,484,288 | 11/1984 | Riemenschneider | 312/268 X |

FOREIGN PATENT DOCUMENTS

| | | | |
|---|---|---|---|
| 2034222 | 1/1972 | Fed. Rep. of Germany | 312/268 X |
| 3015978 | 11/1981 | Fed. Rep. of Germany | 198/810 |
| 636152 | 12/1978 | U.S.S.R. | 312/268 |

Primary Examiner—Kenneth J. Dorner
Assistant Examiner—Thomas A. Rendos
Attorney, Agent, or Firm—Fuller, Puerner & Hohenfeldt

[57] ABSTRACT

A control system for vertical storage equipment requires only two sensing devices, in combination with a microprocessor controller, for positioning a selected article carrier at a specified work station. One sensor senses a reference mark having a direct speed and position relation with the carriers. The second sensor senses at least one reference mark mounted to a high speed member in the drive mechanism used to move the carriers. By sensing the high speed member, the resolution of the control system is greatly increased, thereby providing the control system with increased accuracy and versatility. A flywheel having a relative inertia greater than the total of the remaining moving parts is preferably employed to negate the influence of carrier loading conditions on control system smoothness and accuracy.

20 Claims, 4 Drawing Figures

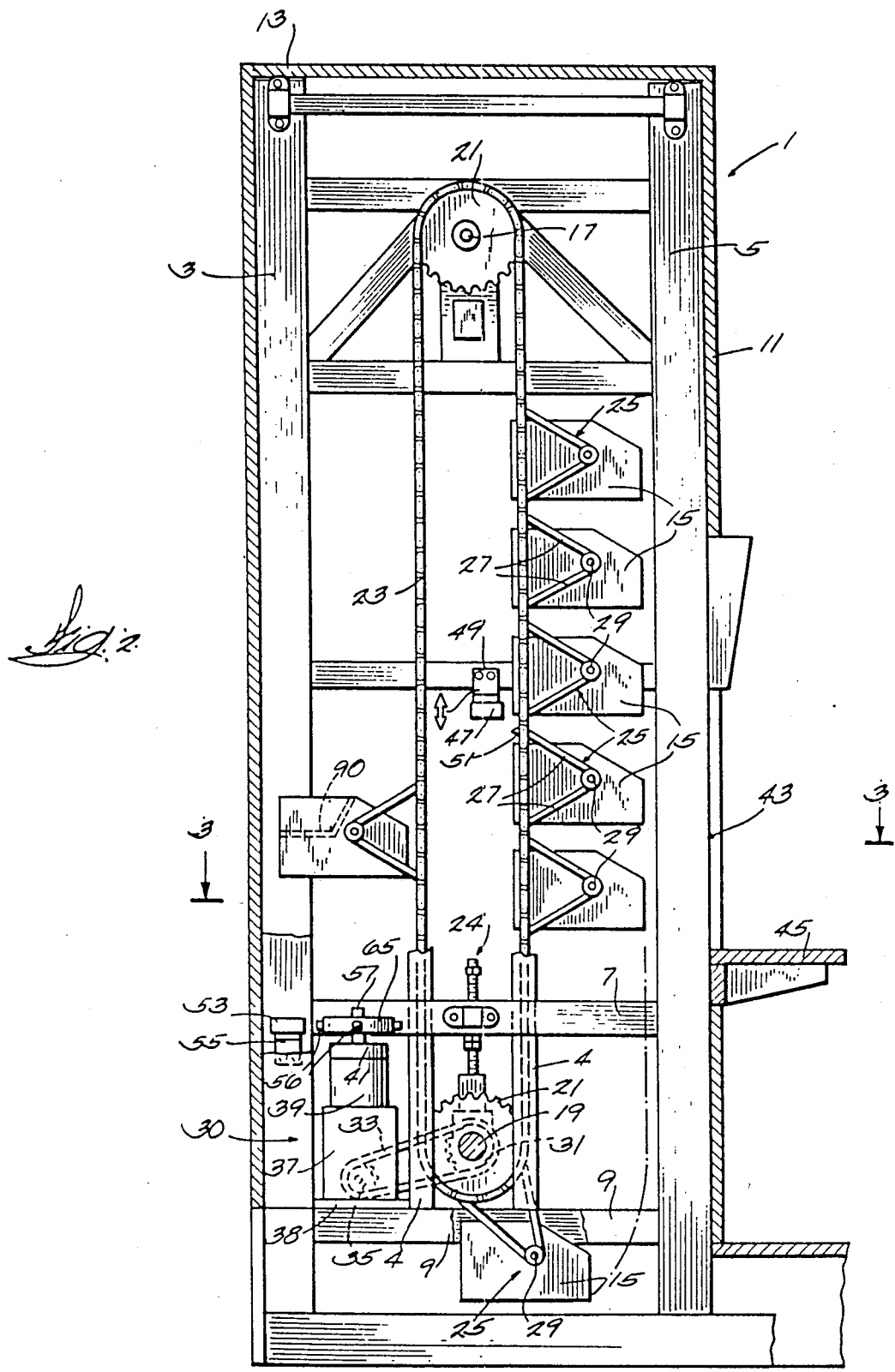

CONTROL SYSTEM FOR VERTICAL STORAGE EQUIPMENT

RELATED APPLICATION

This application is a continuation in part of application Ser. No. 560,499, filed Dec. 12, 1983 now abandoned.

BACKGROUND OF THE INVENTION

This invention pertains to vertical storage and retrieval systems and, particularly, to controlling such systems to facilitate conveying any one of a plurality of vertically movable article storage carriers to an exact location at an operator's access station.

Vertically arranged storage and retrieval systems are used where it is desired to conserve floor space in a building. Typically, these storage systems are comprised of a vertically driven closed loop chain conveyor to which a plurality of material or article carriers are pivotally connected. The conveyor is driven to establish any of the carriers at a location or locations where articles can be inserted or withdrawn from the carriers.

Typical control systems for vertical storage equipment have four sensors adjustably mounted to the stationary frame of the equipment and a target mounted to the carriers. Thus, the sensors can detect the carriers as they pass on the conveyor. Proximity sensors are commonly used. The first sensor detects the carrier target when it is in close proximity to enable the locations of the carriers to be referenced to a single point. The second sensor counts the carriers as they move past it for system indexing. The third sensor senses the carriers as they pass in one direction and generates a signal that is used to interrupt power to the conveyor drive motor and to energize a brake that stops movement of the conveyor in that direction. The fourth sensor operates in a fashion similar to the third sensor, except that it senses the carriers and is used to slow and stop the conveyor when it is moving in the opposite direction.

One of the problems with prior art of vertical storage and retrieval (VSR) systems has been to get any selected carrier to stop exactly at the desired level at the operator access station. Inaccuracies result from tolerances or variations in the carrier support and drive mechanisms plus inability to anticipate accurately what the deceleration curve of the carries will be, especially when they are carrying markedly different loads. It is perceived that an underlying cause of poor stopping resolution in prior art systems is the one-to-one relationship that exists between the frame mounted sensors and the carriers being sensed.

A significant deficiency in prior art controllers is that they are dedicated to controlling a given conveyor system that is equipped with a specific number of carriers. Typically, the carriers are somewhat like open sided troughs that are compartmentalized along their length. In some applications, however, it is also desirable to subdivide one or more of the carriers with partition walls or shelves that create one or more compartments where one is above the other in a single carrier. Existing control systems do not have the capability of positioning any one of the intermediate vertically arranged compartments at a specific level at the operator access station. In some VSR installations it is desirable to have more than one access station, as, for instance on different floor levels or on opposite sides of the equipment. In this case, prior art equipment required duplicate sets of sensors and associated controls for each user access station. Separate controllers increased the cost of the equipment. Also, known control systems always require equal spacing or pitch between carriers on the conveyor which is a further limitation on their versatility. Moreover, in prior art systems the spacing of all of the sensors on the conveyor supporting frame must be individually adjusted to suit the particular carrier pitch even if the pitch or spacing between carriers is uniform.

In vertical storage equipment, the carriers are usually pivotally mounted to two parallel running closed loop conveyor chains. Thus, when the conveyor is being driven to establish a preselected carrier at the work station level, some of the carriers are running downwardly on one side of the chain loop and others are running upwardly on the other side. The weight of the articles in the carriers may differ so that a significant imbalance exists between the carriers on opposite sides of the conveyor. In prior art VSR systems, the accuracy with which a carrier can be positioned at the access station varies with the amount of imbalance that exists. Moreover, when there is significant imbalance, jerky starts and stops can result. The conventional solution to this problem is to interpose a speed reduction system between the drive motor and the carrier conveyor, but, this by itself, does not solve the problem of obtaining smooth starts and stops or significantly improved carrier positioning accuracy.

SUMMARY OF THE INVENTION

The vertical storage and retrieval system controller described hereinafter achieves: precise and high resolution positioning of any preselected carrier or intermediate shelf in a preselected carrier with respect to a given level at the user access station; smooth starting and stopping of the carriers: easy but rarely required setting or adjustment of the position sensors; reduction in the number of position sensors; and, automatic initialization and recalibration of the position detecting system after installation and after any adjustments are made such as tightening the conveyor chains.

Briefly stated, the vertical storage and retrieval equipment which employs the new controller described herein may be conventional in the respect that it comprises a pair of vertically spaced horizontal shafts that are journalled for rotation on a frame. Sprockets are fastened to the ends of each shaft and a pair of laterally spaced apart closed loop conveyor chains run over the vertically separated sprockets. Carrier members are pivotally connected to the chains and they remain in a vertical attitude when they are going up on one side of the chain loops or down on the other side or around the sprockets. A high speed motor drives a conveyor system through a speed reduction mechanism including a gear type speed reducer and a chain coupling the reducer to one of the conveyor shafts. In accordance with the invention, a flywheel is mounted on the shaft extension of the motor. In an actual embodiment, by way of example and not limitation, the motor turns at about 3500 RPM except when it is accelerating or decelerating. Thus, there is a substantial amount of available energy stored in the flywheel when it is rotating at top speed. In other words, its inertia is very high. Because of the speed reduction train between the motor and the conveyor, the inertia of the flywheel is substantially greater than the inertia of the conveyor system. In other words, the flywheel inertia is dominant and is used advantageously to make conveyor starts smooth and the stopping position of each carrier at the user access station repeatable as will be shown.

The new control system is governed by a programmed microprocessor and includes a first stationary sensor that is set at a zero reference level. When a reference marker or target on the conveyor chain is in proximity with this sensor, the sensor produces a signal representative of a zero reference point in time and space. There are four equiangularily spaced reference markers on the flywheel. More could be used if desired. A second sensor detects these reference markers as they pass the sensor during rotation of the flywheel and drive motor. The second sensor produces a pulse every time the motor shaft rotates through a constant predetermined angle of rotation which allows the microprocessor controller to count pulses and translate this data into data representative of the present location and destined location of any of the carriers. In a preferred embodiment, the flywheel rotates at a rotational speed of the motor and, since there are four markers on the periphery of the flywheel in the illustrative embodiment, the number of pulses per second is four times the revolutions per second of the flywheel. For example, accounting for slippage of the motor rotor, the motor may have a top speed of 3500 rpm in which case about 14,000 pulses per minute or about 233 pulses per second are generated. Because of the speed reduction mechanism between the motor and conveyor, a large number of pulses will be generated while the conveyor moves the carriers through a very small distance and this is the basis for obtaining such high carrier positioning resolution.

One important consequence of the new system that uses only two sensors is that whenever any adjustments or variations are made in the mechanical parts of the conveyor system such as tightening or loosening the chains of the conveyor in connection with ordinary maintenance, it is only necessary to run the chain loop through one complete revolution to thereby detect the zero marker once to find the new zero reference after which all counts of the markers on the flywheel can be referenced to it and translated to a representation of the fixed distances between the carriers.

The dominant inertia of the flywheel is used advantageously to position the carriers at the commanded level in the user access station. The microprocessor based controller calculates the number of pulse counts that a carrier is away from its ultimate destination. At the correct moment, the processor dictates deenergizing the drive motor. The conveyor then coasts momentarily to bring the selected carrier towards its stopping position. During this interval, and after the motor controller signals that the motor is turned off, an electromagnetic brake is actuated to bring the conveyor to a stop. In an actual embodiment, stopping accuracy to within 0.025 of an inch is obtained regardless of the magnitude of any imbalance or any differences between the loads in the various carriers since the inertia of the carriers and conveyor system is overwhelmed or dominated by the predictable inertia of the flywheel. How the foregoing and other important features of the new vertical storage and retrieval system controller are achieved will be evident in the ensuing description of a preferred embodiment of the invention which will now be set forth in reference to the drawings.

DESCRIPTION OF THE DRAWINGS

FIG. 2 is a side elevation view of the interior of a vertical storage and retrieval system;

DESCRIPTION OF A PREFERRED EMBODIMENT

Figure 1:
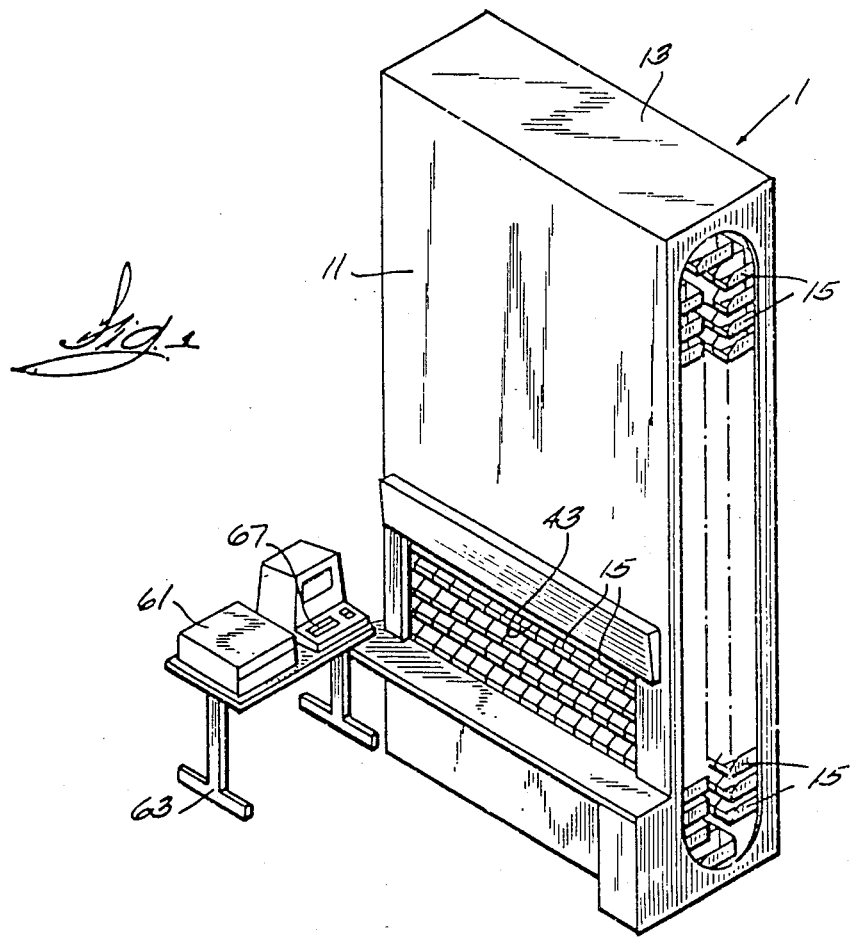
FIG. 1 is a perspective view of a vertical storage and retrieval system in which the new control system is employed.
Figure 3:
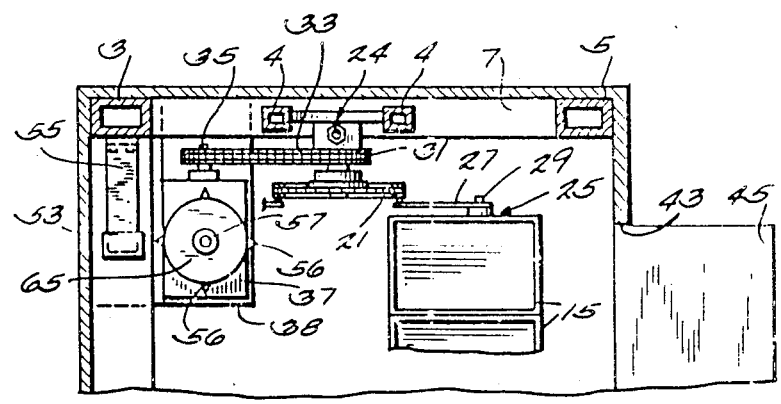
FIG. 3 is an irregular and partial transverse section of the apparatus taken on a line corresponding with 3—3 in FIG. 2.

Referring to FIGS. 1-3, the vertical storage and retrieval apparatus 1 comprises an upstanding frame which includes vertical frame members 3, 4 and 5, and horizontal frame members 7 and 9. The frame is enclosed by metal panels such as a front panel 11 and a top panel 13.

The frame supports a vertically movable conveyor system which is best seen in FIG. 2. The conveyor system comprises an upper shaft 17 and a lower shaft 19. These shafts are parallel and journalled for rotation on the frame. There are a pair of sprockets 21 fixed on opposite ends of upper shaft 17 and a corresponding pair of sprockets 21 fixed on opposite ends of lower shaft 19. One closed loop flexible conveyor chain 23 runs over the vertically aligned sprockets 21 at corresponding ends of the upper and lower shafts 21 and 19 and a corresponding closed loop chain 23 runs over the pair of sprockets on the opposite ends of the shafts. The lower shaft 19 is actually mounted to the frame through the agency of a conventional screw and nut arrangement 24 which is used to establish and adjust the tension in the chains. A plurality of carriers 15 comprising trough-like members are carried on the conveyor chains. The article or material carriers 15 are coupled to the chains by means of brackets 25 that have two arms 27 which have an eye in their outboard ends for receiving pins 29 that extend from opposite ends of each carrier. Thus, the carriers can pivot on the brackets such that the carriers are always maintained in a vertical attitude even as they go around the lower sprockets, which is demonstrated in FIG. 2 where one carrier 15 is negotiating the curve around the lower sprockets 21. Most commonly, the carriers are spaced at a uniform distance around the conveyor chain loop and for the sake of simplifying the explanation, that condition will be assumed to exist in the described embodiment of the equipment.

The conveyor chains 23 are translated or driven in reversible vertical directions by means of a power drive system that is generally designated by the numeral 30. The prime mover is a reversible electric motor 39 which is mounted within the apparatus frame as can be seen in FIG. 2. One end of the motor shaft is coupled to a speed reducer mechanism 37 which is a conventional gear reduction system. The output shaft of the speed reducer has a sprocket 35 fastened to it. This sprocket is coupled by means of a chain 33 to a sprocket 31 on lower shaft 19 to thereby transmit the driving force to the conveyor chains 23. The speed reducer 37 has a bed plate 38 for fastening it to the equipment frame. Electric motor 39 is actually integral with the speed reducer housing. The motor shaft portion which extends from the end opposite of the motor from the speed reducer is marked 57. There is an electrically actuated brake assembly 41 integrated with the housing of motor 39. This is a conventional disk brake assembly. The electromagnetic operator for the brake is not visible but it will be understood that when the operator is deenergized, the brake will be engaged by spring force and when it is energized, the brake will be released. Thus, motor rotation is enabled by electrically energizing the brake and is stopped by deenergizing the brake.

A flywheel 65 is fixed on motor shaft extension 57. There are, in this example, four prongs 56 extending radially from the periphery of flywheel 65. These prongs are equiangularily spaced about the periphery of the flywheel and they constitute markers which are used to detect the angular position of the flywheel at regular intervals. There is a sensor 53 secured to the frame by means of a bracket 55. This sensor detects passage of each one of the markers on the flywheel and produces an electric pulse each time a marker passes. Any suitable sensor that responds to a marker upon the flywheel aligning with it by producing a pulse signal can be used. Thus, in effect, a pulse is generated every time the motor shaft turns through a predetermined and constant angle of rotation. The pulses would not have a constant time interval between them when the motor is accelerating or decelerating but this is immaterial. What is important is that the pulse count corresponds to the distance the conveyor moves and vice versa. Stopping resolution is related to the number of markers used.

Due to the reduction mechanism interposed between motor 39 and conveyor shaft 19, it will be evident that a large number of electric pulses will be produced by sensor 53 for a very small increment of movement of the conveyor chains.

There is a second vertically adjustable sensor 47 mounted to the equipment frame by means of a bracket 49 as can be seen in FIG. 2. A prong constituting a zero reference position marker 51 is mounted to the chains. Sensor 47 detects passage of reference marker 51 and produces a signal as the reference marker passes through a position of alignment with sensor 47. Sensors 47 and 53 are the only sensors needed for the control system which will be described in detail shortly hereinafter.

Before discussing the control system, it may be noted that the vertical storage and retrieval equipment 1 is provided with at least one opening 43 in its cover panel through which the user may gain access to the carriers 15 for inserting or retrieving articles. In some installations, an opening similar to the one marked 43 is provided on the side opposite of said opening to provide access to both sides of the equipment. The two openings may be at the same level or at different levels or on different floors of a building. At the carrier loading and accessing station, a shelf 45 is provided. The control system, as will be seen, is capable of positioning any selected carrier precisely at the level of the shelf or at any level in the work station with high precision. In some installations, one or two shelves running lengthwise of a carrier are installed to subdivide a carrier or some of them or all of them into separate vertically arranged compartments. In FIG. 2 the carrier 15 on the left side of the conveyor chain 23 is the only carrier provided with a shelf represented by the dashed lines marked 90. It will be shown that with the new controller any one of the shelves in a carrier can be positioned precisely at the desired stopping level such as the top of table 45.

Figure 4:
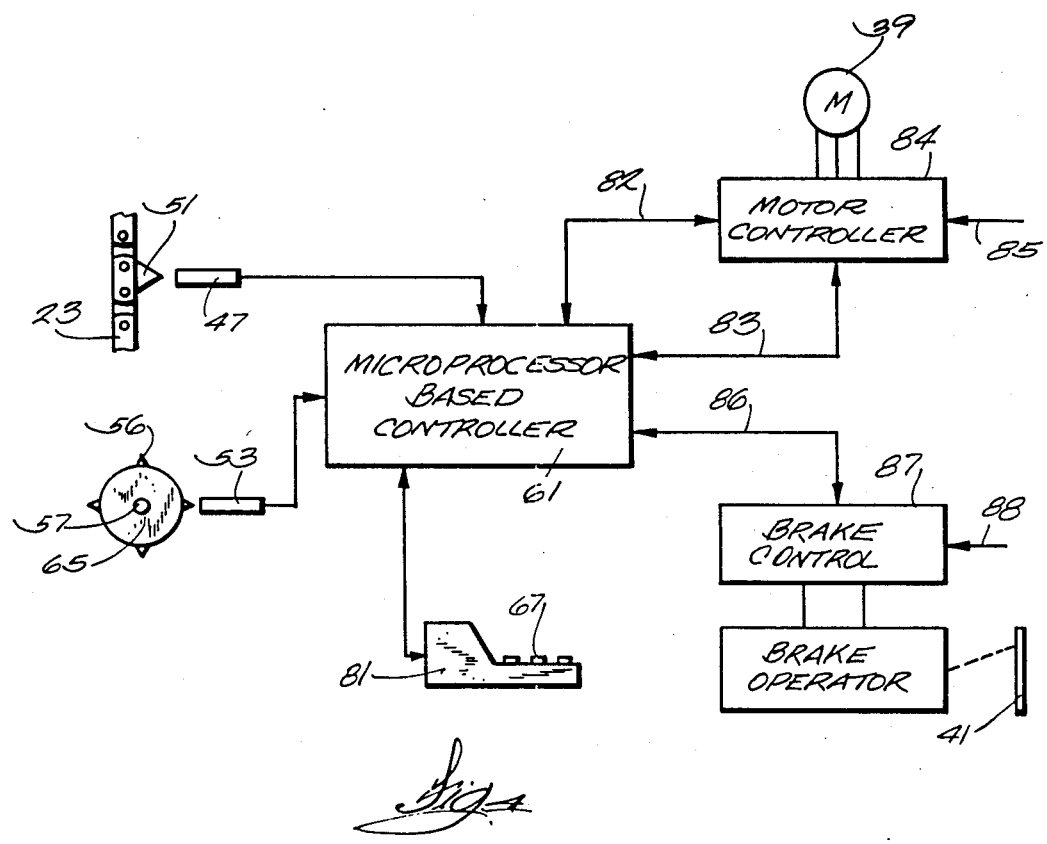
FIG. 4 is a block diagram of the control system and the conveyor drive system for the vertical storage and retrieval system.

Refer now to FIG. 4 for a discussion of the controller 61 which is located on a table 63 in FIG. 1. This figure shows the previously discussed zero or absolute reference marker 51 mounted on chain 23 adjacent marker sensor 47. The flywheel 65 on motor shaft extension 57 and the four markers 56 and their cooperating sensor 53 are also repeated in FIG. 4. The controller is generally designated by the reference numeral 61 which is labeled microprocessor based controller. The control console is marked 81 and is provided with a key board 67 by which the operator can enter commands into the system. For instance, when the operator desires a particular one of the carriers 15 to be positioned at the work table of 45 level, the operator enters the code identification for that carrier by means of the key board 67 and the controller causes the conveyor to drive the carrier to its desired destination.

Assume now that installation of the vertical storage and retrieval system has been completed and that the controller is to be initialized. A command is entered which causes the electromagnetic brake 41 to be energized and released and the motor 39 to run. As a result, zero or absolute reference marker 51 will pass sensor 47 which will produce a reference signal corresponding to a count of zero. From that moment, the processor counts the high rate pulses that result from markers 56 passing sensor 53 as the motor runs. The processor is, meanwhile, counting the pulses from sensor 53. Motor operation is continued at least until another pulse is produced by zero reference sensor 47 in which case the processor stops counting the high rate pulses. It then has and stores in RAM the total number of high rate pulses for one complete rotational cycle of the chain or conveyor system. The program or instructions for doing this is, of course, stored in a read-only memory ROM, not shown. The processor then uses its arithmetic logic unit, not shown, to divide the total number of counts by the number of carriers in the system to thereby determine and store the number of pulses or counts representative of the distance between carriers in a read-write memory or RAM, not shown. If each of the carriers had one shelf in it for dividing it into two superimposed compartments, this information is stored in ROM and the microprocessor divides the total number of counts by two to get the number of counts or distance between shelves on adjacent carriers. For example, if there were twenty carriers on a conveyor in a system and each had one shelf to divide the carrier into two compartments, basically, the microprocessor multiplies the number of shelves per carrier by the number of carriers to obtain the total number of stopping places. In other words, the number of shelves is an input to the microprocessor and it uses the new number in its division and comes up with a new number of counts from level to level. With twenty carriers and two shelves in each, the index positions for the carriers are represented by 1/40 of the total number of counts.

In an actual embodiment, the count information is stored in a volatile RAM but there is a standby battery for the memory so that the initialization or calibration information will not be lost if there is a power supply failure. Normally, initial conditions are preserved and used until there is some maintenance work done on the equipment such as tightening or losing of the conveyor chains. In such case, it is necessary to re-initialize but this is no problem because it only requires time to run the chain conveyor through one cycle or loop length as previously described to get the counts referenced back to the zero reference level.

It should be noted that prior art storage systems detect all carriers individually and, therefore, can't accommodate subdivision of carriers unless they sense the subdivisions with additional sensors.

Assume now that the user has used the key board 67 to command a certain carrier to its destination at the work station. As will be explained later, in accordance with the invention, the microprocessor immediately makes a determination as to which direction the chain conveyor should start to run in order to bring the specified carrier to the work station level through the shortest route and in the least amount of time. When the motor rotational direction is determined, one of two output lines 82 or 83 will switch to a high logic signal level. For instance, if motor 39 is determined to run in one direction to position the carrier in the shortest possible time signal on line 82 will go to a logical high level. If the motor is to run in the other direction, the signal on line 83 will go to a logical high level. These signals are selectively input to a motor controller which is represented by the block marked 84. The motor controller, which is basically a relay or solid state switching device that makes the proper connections between the power input lines 85 and the motor to cause the motor to run in one direction or another. Substantially simultaneously but slightly before the motor 39 is energized, the microprocessor causes one of its output lines 86 to switch to a high logical level and this signal is transmitted to the brake control module 87 to effect brake release. The brake control module has relays or solid state switches for connecting the power line 88 to the electromagnetic brake operator 41. Thus, as soon as the brake is energized and released, the motor begins to run in a preselected direction. Release of the brake and starting of the motor are so nearly coincident with each other that there is no time for drifting of the carriers due to any imbalance in their loading.

As the carriers move, the microprocessor monitors where they are located by keeping track of the counts and, hence, the corresponding number of movement increments between the present position of the designated carrier and the zero reference position. The microprocessor is programmed to produce the logic signal which results in turning off motor 39 at a predetermined time or by a predetermined number of counts prior to the designated carrier having reached its final destination. When the motor is deenergized, it begins to decelerate but rotation is continued under the influence of the inertia of the flywheel 65 on the motor shaft. The brake signal line 86 switches back to a low logic level to deenergize the brake operator and apply the brake by a predetermined number of index counts obtained from the four reference markers on the flywheel before the designated theoretical stop level of the carrier is reached. This takes into account the brake operation release time and the dropout time of the control relays or deactivation time of the semiconductor switching devices.

In prior art vertical storage and retrieval systems it would not be possible to get reproducible stopping of the carriers where the motor is deenergized by a certain amount of counts or time before the carrier reaches its destination and where the brake is applied a predetermined number of counts after the motor is deenergized. This is so because the inertia of the conveyor system in prior art equipment is not only dominating by itself but is variable depending on whether the sum of the loads being lifted or moved downward on one side of the conveyor loop is greater than the sum of the loads on the other side. Moreover, the inertia of the conveyor system can vary as the various loaded carriers go around the conveyor sprockets and nothing is done to compensate for this. Similar variable inertia effects may exist in any conveyor driven with a new controller but the effects are negated by having the inertia of the flywheel overwhelm or dominate the inertia of the conveyor in accordance with the invention. Thus, with the new control system, conveyor inertia is negated and flywheel inertia follows a more constant and repeatable curve with respect to time and is predictable so that the motor deenergization and brake application events can be executed in sequence over an interval containing the same number of counts in any given vertical storage and retrieval system. Because each count derived from sensor 53 corresponds to such a small amount of movement by the conveyor, the carriers can be located with high resolution at the access station.

The manner in which the controller brings about determining which direction the motor should start to run in order to get the selected carrier to the work station by way of the shortest route will now be discussed. When a move command is entered by the key board 67, the microprocessor again uses the total count around a conveyor chain cycle to determine which direction the motor should rotate. The microprocessor logic divides the total count in half to determine how many counts or what the distance is half way around the conveyor chain loop. Then it compares the present location of the carriers relative to the zero reference level with the calculated destination. For example, if it must advance the designated or commanded carrier five carriers up to get to the work table level, the microprocessor will add five of the incremental numbers to the value it knows it must traverse through half of the carriers. It thereby determines what the theoretical stopping place is going to be. Then the microprocessor determines if the stopping place is more than half way around the conveyor or less than half way around. If it is less than half way around in one direction it will dictate that the designated carrier should go up to get to its destination. If it is more than half way around, it will be closer to go the other way around and it selects a motor rotation that will move the chain in the down direction.

Providing a vertical storage and retrieval system that uses only two sensors reduces system cost by a small amount compared to the whole but it increases reliability by a great amount. Moreover, it simplifies adjustment or calibration. It is only necessary to fix the bracket holding the zero reference level sensor 47 and input the number of carriers. If any carrier stops above or below the work table level all carriers will have the same error so it is only necessary to adjust the bracket holding the zero reference level sensor 47 and initialize. Then all carriers will be corrected by the same amount since they are equally spaced along the conveyor chains.

For vertical storage and retrieval equipment installations where it is desired to have a carrier access station on the opposite side of the unit from where table top 45 is located, another microprocessor based logic system is used. The second logic system is a slave to the controller 61. The second logic system is provided by the first controller with the position information and calculates its own position.

In an alternative implementation of the invention, not shown, instead of the processor controlling the motor brake to be applied when a designated carrier is a predetermined number of counts or movement increments from the operator station level, instaneous speed calculations are made by the processor. As the carrier approaches its destination the motor is deenergized and at a distance from the destination that varies with speed, the brake is applied. The flywheel still serves to negate the influence of carrier loading differences. Stopping is smooth and accurate.

In summary, a vertical storage and retrieval system controller has been provided wherein the operator can select any desired carrier or a shelf within any desired carrier by using key pad 67 to input the identification code for the carrier or shelf. The control system determines the shortest travel distance and begins to move the carrier conveyor in the direction that will result in least distance being traversed to get the carrier to the access station. At a predetermined distance from the access station, the conveyor drive motor is deenergized and at a lesser distance brake is applied. The time for motor deenergization and subsequent the brake application are predetermined and predictable because these events are to a large extent functions of the inertia of the system and the inertia is known with a good degree of accuracy because it is established by using a flywheel whose inertia dominates the conveyors inertia though the flywheel controls acceleration and deceleration time. During a conveyor starting interval, the flywheel modulates acceleration out of the motor and follows a smooth curve though the carriers do not start with a jerk despite the fact that there might be considerable imbalance between the loads on opposite vertical runs of the conveyor chains.

I claim:

1. In vertical storage equipment for storing a multiplicity of articles and having a generally upstanding framework; cover panel means for covering the framework, said cover panel means defining at least one opening to the interior of the vertical storage equipment for depositing and retrieving articles; support means mounted for moving in opposite vertical directions in said framework and a plurality of article carriers connected to said support means for generally vertical movement; a motor and a drive mechanism mounted to the framework and operatively coupling said motor and support means for moving the support means and article carriers, comprising:
   (a) programmed controller means and manually operated means for input of data to said controller means indicative of the carrier that is selected to be moved to said opening;
   (b) a first reference mark secured to said movable support means;
   (c) a first sensor adjacent the path along which said support means moves for sensing said first reference mark when said mark on said movable support means moves past said sensor, the signals from said sensor being input to said controller means;
   (d) a member that moves in response to operation of said motor and at least one second reference mark fixedly attached to said member, said member moving at a higher speed than said support means; and
   (e) a second sensor adjacent the path in which said member moves for sensing said at least one second reference mark when said mark moves past said second sensor and producing a plurality of signals for every one signal produced by said first sensor, the signals from said second sensor being input to said controller means,
   (f) a motor controller operative to connect said motor to an electric power source and to disconnect said motor from said source in response to start and stop signals generated by said programmed controller means,
   (g) said programmed controller means responding to input of said data by determining the number of signals that must be produced by said second sensor for said selected carrier to arrive at said opening, said programmed controller then generating and supplying a start signal to said motor controller and responding to said number of signals having occurred by supplying a stop signal to said motor controller.

2. The vertical storage equipment according to claim 1 wherein said member that moves is a flywheel driven by said motor, including second reference marks in addition to said at least one second reference mark and all of said second reference marks are equiangularly spaced about said flywheel.

3. The vertical storage equipment according to claim 2 wherein there are four second reference marks equiangularly spaced about the axis of said flywheel.

4. The vertical storage equipment according to any one of claims 2 or 3 wherein said flywheel has an inertia reflected to the motor greater than the inertia of said drive mechanism, said support means and said carriers, which is reflected to the motor,
   so that the flywheel negates the influence of variable carrier loads on carrier starting and stopping accuracy and smoothness.

5. The vertical storage equipment according to claim 4 wherein a shaft extends from said motor and said flywheel is mounted to said shaft.

6. The vertical storage equipment of claim 1 wherein at least one article carrier includes an intermediate shelf attached thereto, and wherein said means for input of data to said controller means is operated to input data indicative of said selected carrier and the shelf in said carrier that is to be positioned at said opening.

7. The vertical storage equipment according to claim 6 further comprising a work shelf fastened to the framework below said at least one opening in the cover panel means to create an operator work station at which the carriers or shelves are accurately located.

8. The vertical storage equipment of claim 1 wherein the support means includes a pair of movable chain loops to which said carriers are pivotally connected at uniform intervals.

9. The vertical storage equipment according to claim 1 wherein said movable member that has said at least one second reference mark moves at a higher speed than said support means.

10. Vertical storage equipment for storing articles comprising: a support mechanism movable in opposite vertical directions and supported in the vertical storage equipment, a plurality of carriers connected to said support mechanism at spaced apart locations and motor means and a drive mechanism coupling said motor means to said support mechanism for moving said support mechanism to cause a selected one of said carriers to be moved from a location at which it is stopped and means for stopping said selected carrier at a specified location,
- (a) said drive mechanism including a movable member that moves at a speed greater than the speed of the support mechanism whenever said motor runs and a brake for braking the motor;
- (b) a control system comprising:
  - i. a programmed microprocessor controller and manually operated means for input of data to said controller indicative of the carrier that is selected to be moved to said specified location;
  - ii. means providing a first reference mark secured to the movable support mechanism and a first sensor fixedly mounted adjacent the path of movement of said support mechanism for sensing the first reference mark when said mark moves past said sensor;
  - iii. at least one second reference mark attached to said movable member and a second sensor proximate to said movable member for sensing said at least one second reference mark as said mark moves repeatedly past said second sensor at high speed;
  - iv. a flywheel driven rotationally by said motor;
- (c) a motor controller operative to connect said motor to an electric power source and to disconnect said motor from said source in response to start and stop signals generated by said programmed controller,
- (d) said programmed controller responding to input of said data by determining the number of signals that must be produced by said second sensor for said selected carrier to arrive at said specified location, said programmed controller then generating and supplying a start signal to said motor controller and responding to said number of signals having occurred by supplying a stop signal to said motor controller; and
- (e) means responding to generation of said stop signal by applying said brake and deenergizing said motor when the selected carrier is still at a predetermined distance from said specified location, so that the flywheel inertia aids in continuing movement of said movable support by a predictable amount to accurately and smoothly stop the selected carrier at the specified location.

11. In combination with vertical storage and retrieval apparatus including frame means, a conveyor supported on said frame means and comprised of flexible loops formed in vertically extending closed loops, rotatable elements on which said loops move such that when at least one of said elements is driven rotationally one side of said loops will move upwardly and the other side will move downwardly, a plurality of article carriers connected to said flexible members in uniformly spaced apart relationship around the loops, an electric motor having a shaft, a speed reducer mechanism having power input means coupled to said shaft and output means coupled to said rotationally driven element to turn it at much lower than motor speed, an electrically operated brake for stopping movement of the conveyor, and an improved control system for positioning a selected one of said carriers at a specific level at a carrier access station, said system comprising:

programmed processor means having input and output means, first sensor means located at a reference position proximate to the path of movement of said conveyor and operative to generate a zero reference signal each time said conveyor passes through said reference position and means coupling said reference signal to said input means of said processor means, a member driven rotationally by said motor shaft and marker means defining equiangular rotational increments on said member;

second sensor means located proximate to said member and responsive to the passing of each marker means by producing electric pulses, and means for coupling said pulses to said input means of said processor means, said processor means being operative to count the number of said pulses between successive reference signals and to divide said number by the number of carriers to determine and store the number of pulses representative of the distance between carriers, a motor controller operative to connect said motor to an electric power source and to disconnect said motor in response to motor start and stop signals, respectively, from said processor means, means for the user of said storage and retrieval apparatus to input to said processor input means data identifying the carrier desired to be positioned at said specific level at said access station, said processor means responding to said data by providing a start signal to said motor controller to energize said motor to start driving said conveyor and the identified carrier toward said specific level at said access station, said processor means being operative to compare the number of counts the identified carrier is away from said level with the number of counts said carrier was away from said level at the time of said start and signal at a predetermined number of counts before said level is reached said processor means providing a signal to said motor controller to deenergize said motor.

12. The apparatus according to claim 11 including a flywheel coupled to said motor shaft, said flywheel having higher inertia effect than said conveyor so said flywheel inertia determines the distance said conveyor will move after said motor is deenergized.

13. The apparatus according to claim 12 wherein said member is a flywheel mounted directly to said motor shaft, and said markers are on said flywheel and are equiangularily spaced as aforesaid about the rotational axis of the flywheel and a said sensor means is located in proximity to said flywheel for generating one of said pulses in response to being passed by each of said markers, a marker on one of said flexible loops and movable with said one flexible loop and said first sensor means responding to said marker aligning therewith as said loop member moves by producing said zero reference signal.

14. The apparatus according to claim 11 wherein said member is a flywheel fastened on said motor shaft for rotating at motor speed, said flywheel having higher inertia effect than said conveyor so said flywheel inertia determines the distance said conveyor will move after said motor is deenergized.

15. The apparatus according to claim 11 wherein:
said processor responds to input of carrier identification data by immediately providing a signal to said brake controller to effect release of said brake and then providing said signal to start said motor for driving said conveyor, said processor responding to occurrence of a number of pulse counts corresponding to said identified carrier nearing said access station by providing the signal for applying the brake, and wherein said member is a flywheel driven from said motor shaft, said flywheel having great enough mass to develop sufficient inertia to exceed the inertia of said conveyor that is reflected back through said speed reduction mechanism so that said flywheel substantially governs the acceleration and deceleration rate of the conveyor and the distance said conveyor will travel between deenergization of said motor and applying of said brake.

16. The apparatus according to claim 15 wherein said flywheel is mounted directly on said motor shaft.

17. The apparatus according to claim 16 wherein there are four markers on the flywheel so the number of pulses produced between occurrence of two consecutive reference signals is equal to four times the speed reduction ratio between the motor shaft and said driven element in the conveyor.

18. The apparatus according to claim 11 wherein said first sensor is mounted for being adjusted vertically to change the level of the conveyor at which said reference signal is produced and accordingly to change the level at which all of the carriers will come to a stop.

19. The apparatus according to claim 11 wherein each of said carriers is subdivided into two or more compartments, one above the other, by means of one or more shelves and said processor means is operative to multiply the number of carriers by the number of compartments in a carrier and to divide the result into the total number of pulse counts between said zero reference signals to determine and store the number of pulses representative of the height of the compartments in adjacent carriers and said data input means provides for input of data identifying a carrier and the shelf in the carrier that is to be driven by said conveyor to said specific level at the access station.

20. The apparatus according to claim 11 wherein said processor means responds to input of data identifying a carrier by determining the present location of the carrier as measured by the total number of counts representative of the distance the identified carrier would have to move to get to said level at the access station if the carrier were moved in a selected one of the directions in which they can be driven, and by comparing said amount of movement with one-half of the distance from said level around said conveyor loop to determine if said present location is more or less than said one-half distance, and by producing a signal to cause said motor to drive the conveyor in a direction opposite of said one direction if said distance is more and in the one direction if said distance is less such that the identified carrier is always moved through the shortest distance to said station.

* * * * *